J. H. BRYAN.
RAKE.
APPLICATION FILED FEB. 20, 1912.

1,055,131.

Patented Mar. 4, 1913.
2 SHEETS—SHEET 1.

Witnesses
Hugh H. Ott
John J. McCarthy

Inventor
John H. Bryan
By Victor J. Evans
Attorney

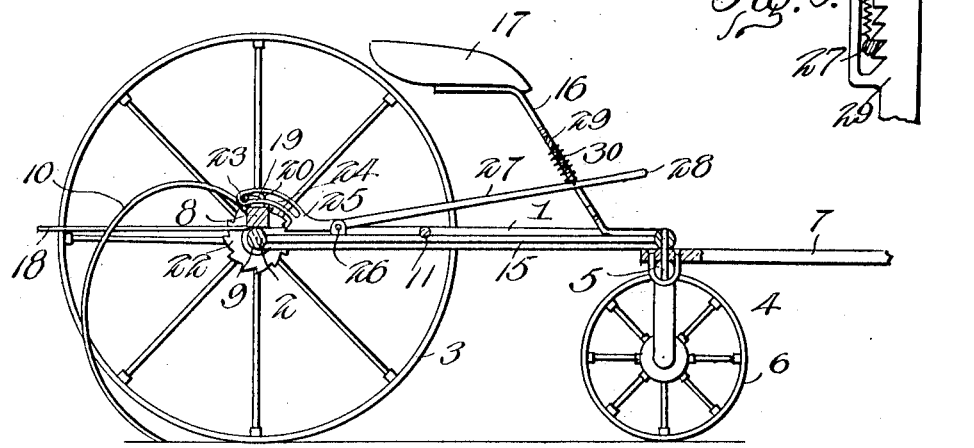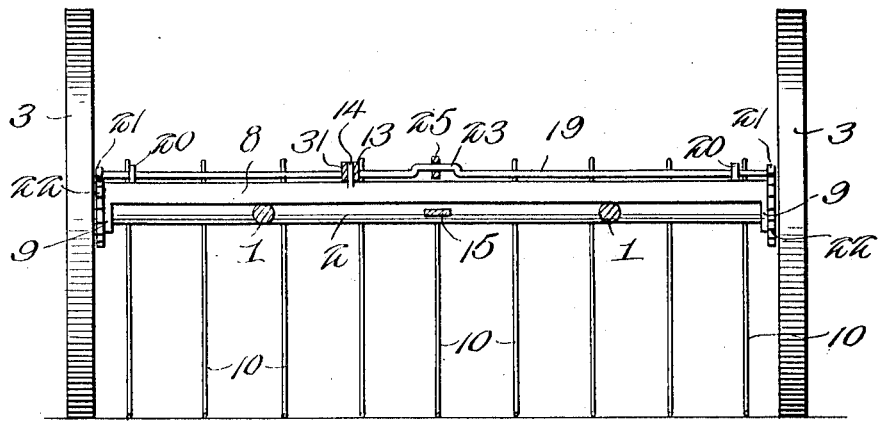

UNITED STATES PATENT OFFICE.

JOHN H. BRYAN, OF MOLINE, KANSAS.

RAKE.

1,055,131.
Specification of Letters Patent.
Patented Mar. 4, 1913.

Application filed February 20, 1912. Serial No. 678,795.

*To all whom it may concern:*

Be it known that I, JOHN H. BRYAN, a citizen of the United States of America, residing at Moline, in the county of Elk and State of Kansas, have invented new and useful Improvements in Rakes, of which the following is a specification.

My present invention relates to improvements in rakes and has particular application to rakes adapted to be drawn by draft animals for the purpose of gathering hay and the like.

In carrying out this invention, it is my purpose to provide a rake of the above type, whereby the draft animal may be relieved of the weight of the rake and operator so that the energy of such animal may be concentrated to the draft or pulling action.

Furthermore, I aim to provide a rake of this character wherein the rake may be supported upon and carried by a wheeled frame and rendered operative and inoperative at the will of an operator.

It is also my purpose to provide a rake of this class wherein the tines may be rendered operative and inoperative at will and locked in either of their positions.

With the above and other objects in view, the invention consists in the construction, combination and arrangement of parts hereinafter set forth in and falling within the scope of the appended claim.

Figure 1:
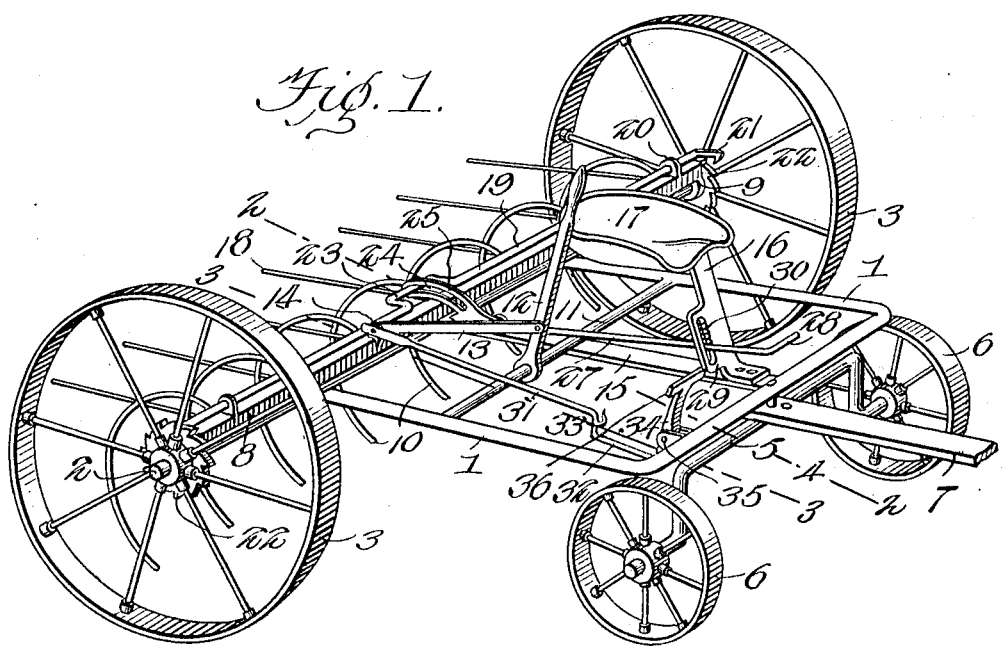
Figure 3:
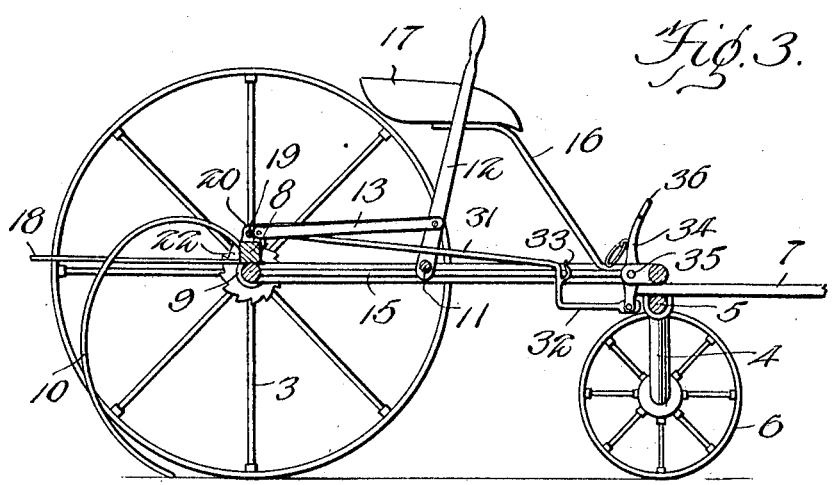

In the accompanying drawings wherein has been illustrated one embodiment of my invention, Figure 1 is a perspective view of a wheeled rake constructed in accordance with the present invention. Fig. 2 is a section on the line 2—2 of Fig. 1. Fig. 3 is a section on the line 3—3 of Fig. 1, and Fig. 4 is a transverse sectional view through the frame of the rake showing the rear axle and associated parts in elevation. Fig. 5 is a view in elevation of a detail of the invention.

Similar reference characters designate like parts throughout the several views.

Referring now to the accompanying drawings in detail, the rake includes a wheeled vehicle composed, in the present instance, of a substantially U-shaped frame 1 the arms of which are securely fastened to the rear axle 2 supporting at its opposite extremities the traction wheels 3. Swiveled to the interconnecting bar of the frame 1 and below the same is a pilot truck 4 embodying an offset axle 5 and a pair of ground wheels 6, a tongue 7 being connected to the axle of the pilot truck to accommodate the draft animals. It is conceivable, however, that shafts may be utilized instead of the tongue shown so as to accommodate the attachment of a single draft animal to the vehicle.

Arranged longitudinally of the rear axle and mounted thereon for swinging movement is what I term a head piece 8 supported upon the axle by means of depending ears 9 whereby the head piece may be swung about the axle. This head piece, as shown, carries a plurality of tines 10 designed to gather the hay or other material in the movement of the vehicle and adapted to be rendered operative and inoperative according to the movement of the head piece, the tines being arranged transverse the path of travel of the vehicle to facilitate the gathering of the material. The arms of the U-shaped frame are interconnected intermediate their ends through the medium of a cross bar 11 and pivoted to this cross bar at one side of the center line of the vehicle is a hand operated manipulating lever 12 connected to the head piece 8 through the medium of a link 13 pivotally connected to the lever 12 above the connection of such lever to the bar 11 and also pivotally connected to the head piece 8 through the medium of ears 14 so that in the movement of the lever the head piece may be rocked about the axle to render the tines operative and inoperative manually and according to the movement of the aforementioned lever. Thus, when the lever 12 is moved in a forward direction, the tines will be elevated or arranged in a horizontal plane, and in the movement of the lever in a rearward direction, the tines will be rendered operative to gather the hay, that is disposed in a vertical position with respect to the travel of the vehicle. A brace bar 15 connects the interconnecting bar of the frame 1 with the rear axle and is arranged at right angles to the bar 11 of the frame, and this bar 15 carries a seat post 16 upon which is mounted a seat 17 located preferably centrally of the vehicle frame and at one side of the manipulating lever 12 so as to accommodate an operator and enable such operator to have complete control of the machine. Secured to the rear axle 2 of the vehicle and projecting rearwardly thereof and between the tines 10, are a plurality of bars 18 designated to hold the gathered material away from the tines when the latter are operated to an elevated position so that such material may be released.

In order to permit the tines to be elevated by the foot of an operator, I have provided a foot controlled mechanism, which in the present embodiment of the invention, includes a shaft 19 arranged longitudinally of the head piece 8 and rotatably mounted in ears 20 upon such head piece and terminating at its opposite ends in hooks 21 adapted for engagement with ratchet wheels 22 fixed to the hubs of the ground wheels 3. Intermediate its ends, the shaft 19 is offset to provide a crank portion 23, and this crank portion of the shaft is disposed within a segmental slot 24 formed in the curved end 25 of an actuating lever 27 pivoted to the bar 15, as at 26, and forwardly of the vehicle and terminating in a pedal 28 adjacent to and below the seat of the operator. This lever passes through a toothed rack 29 fast upon the post 16 and designed to hold said lever in an operative position, subsequent to the pedal portion 28 thereof being actuated in a downward direction to rotate the shaft 19 and engage the hooks 21 of such shaft with the teeth of the ratchets 22, this movement of the parts permitting movement of the head piece about the rear axle to elevate the tines. A spring 30 is connected to the actuating lever 27 and the rack 29 and acts to normally hold such lever in an upward position consequently relieving the hooks 21 of the influence of the ratchets. From this, it will be seen that when the lever 27 is actuated in a downward direction under the action of the operator, the curved end 25 thereof will be elevated and through the medium of the segmental slot 24 and crank 23 of shaft 19 rotate the latter to bring the hooks 21 into engagement with the ratchets 22 so that in the movement of the ground wheels 3, the tines will be elevated to release the bundle or gathered material, the release of such lever from the teeth of the rack 29 permitting the spring 30 to pull up the lever and disengage the hooks 21 from the ratchet wheels whereby the tines may be lowered or rendered operative by their own weight or by the lever 12, and held in lowered position.

In order to lock the tines in their raised or inoperative position, I make use of a locking mechanism which, in this instance, embodies a rod 31 pivoted in the ears 14 with link 13 and extending forwardly of the vehicle frame and terminating in an offset arm 32 equipped with a hook 33 and pivotally connected to one end of a foot pedal lever 34 fulcrumed as at 35 to the interconnecting bar of the U-shaped frame 1. The offset arm 32 of rod 31 is pivotally connected to lever 34 below the fulcrum thereof, while the upper end of such lever terminates in a pedal 36 to accommodate the foot of an operator. In the movement of the tines to horizontal, the rod 31 is thrown forwardly and consequently the lever 34 swung about its fulcrum to dispose the upper extremity adjacent to the offset arm 32 of the said rod, whereby the hook 33 of such arm may be engaged with a ring or the like on the upper end of lever 34 to hold the tines elevated.

From the foregoing description taken in connection with the accompanying drawings, the construction and mode of operation will be readily apparent, and while I have shown and described one embodiment of my invention, by way of illustration, I desire to have it understood that I do not confine myself to all of the details of construction herein set forth, as modification and variation may be made within the scope of the appended claim and without departing from the spirit of the invention.

I claim:

In a rake, the combination with a wheeled frame, comprising a rear axle and a pilot truck, of a head piece connected to the rear axle and movable thereon and provided with tines, means controlled by the foot of an operator for moving said head piece to render the tines operative and inoperative, a hand lever, connections between said hand lever and head piece for moving the latter to render the tines operative and inoperative independently of the foot controlled means, locking means upon the frame and adapted to lock the head piece against movement by the lever and the foot controlled means, said locking means comprising a rod pivotally connected to the head piece and provided with an offset arm, a hook on said arm, a foot pedal lever fulcrumed between its ends on the frame, means carried by said foot pedal lever and adapted to be engaged by said hook, and a pivotal connection between said offset arm and foot pedal lever.

In testimony whereof I affix my signature in presence of two witnesses.

JOHN H. BRYAN.

Witnesses:
 JNO. D. SHERWIN,
 U. G. SUTTON.

---

Copies of this patent may be obtained for five cents each, by addressing the "Commissioner of Patents, Washington, D. C."